J. W. LISCHER.
PLANT SPRINKLING APPARATUS.
APPLICATION FILED FEB. 24, 1908.

910,400.

Patented Jan. 19, 1909.

Witnesses:
J. J. Laass
G. Kaiser

Inventor
John W. Lischer
By his Attorney
E. Laass

UNITED STATES PATENT OFFICE.

JOHN W. LISCHER, OF SYRACUSE, NEW YORK.

PLANT-SPRINKLING APPARATUS.

No. 910,400.   Specification of Letters Patent.   Patented Jan. 19, 1909.

Application filed February 24, 1908. Serial No. 417,240.

*To all whom it may concern:*

Be it known that I, JOHN W. LISCHER, a citizen of the United States, and resident of Syracuse, in the county of Onondaga, in the State of New York, have invented new and useful Improvements in Plant-Sprinkling Apparatus, of which the following, taken in connection with the accompanying drawings, is a full, clear, and exact description.

This invention relates to apparatus placed over plant and flower-beds for sprinkling purposes.

The present invention is designed to be either installed in greenhouses or arranged over beds of plants grown in the open-air, the main object being to provide a sprinkling-apparatus which shall be very efficient and reliable in its operation, easily and conveniently controlled, and at the same time shall be inexpensive to construct.

To the end the invention consists essentially of a suitably supported water-conducting pipe adapted to move over the plant-bed and provided with spraying-means, means for supplying the pipe with water under pressure, and means for imparting movement to said pipe.

The invention also consists in certain novel details of construction and arrangement of the component parts of the sprinkling-apparatus hereinafter fully described and set forth in the claims.

Figure 1:
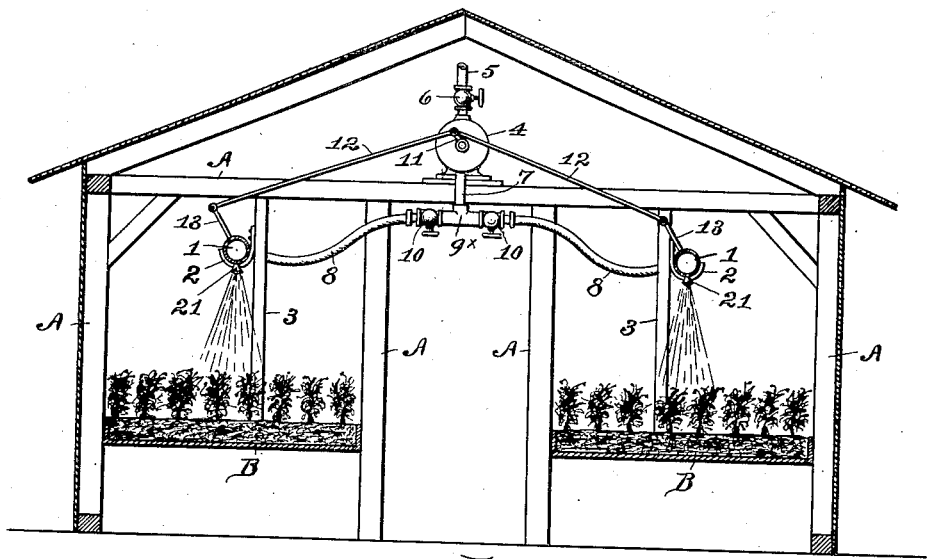
Figure 2:
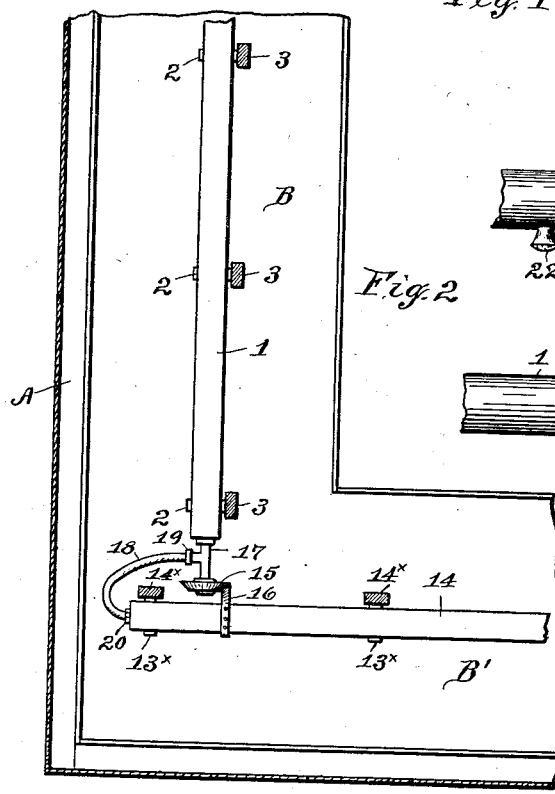
Figure 3:
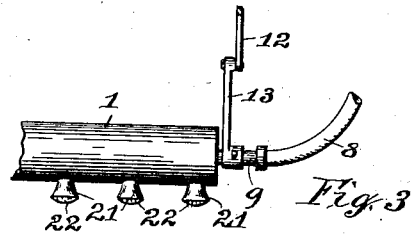
Figure 4:
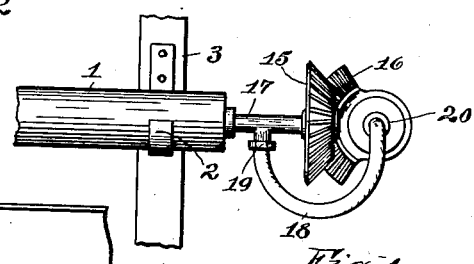

In the accompanying drawings Figure 1 represents a transverse section of a greenhouse equipped with the plant-sprinkling apparatus embodying my invention; Fig. 2 shows a plan view of the usual plant-racks of the green-house, and illustrates the arrangement of the oscillating pipes which conduct the water over the plant-racks, and showing the mechanism for transmitting movement from the main sprinkling-pipe to a branch sprinkling-pipe arranged at an angle thereto; Fig. 3 is an enlarged detail side view of the forward end portion of a main sprinkling-pipe, in this instance designed to be extended lengthwise of the green-house or a bed of plants located out-of-doors, and showing part of the mechanism for oscillating said pipe; and Fig. 4 is an enlarged detail view showing the water-connection between a main sprinkling-pipe and branch sprinkling-pipe, and also showing a mechanism for transmitting motion from the former to the latter.

Referring to the drawings —A—A— denote frame-members of the green-house which may be of any well known construction.

—B—B— represent the usual longitudinally disposed plant-racks which support the beds of plants and extend along the sides of the green-house, and —B¹— represents a similar rack which in some green-houses is arranged across one end thereof. However, the arrangement of these plant-racks is immaterial to the construction and operation of my sprinkling-apparatus. Said apparatus comprises a main oscillating sprinkling-pipe —1— which extends lengthwise of the plant-rack —B— and may be supported in any suitable and convenient manner, but I preferably mount said pipe on brackets —2—2— fastened to the sides of posts —3—3— and arranged centrally over the rack at any desired elevation. In the present instance are shown two of said main pipes which may be supplied with water under pressure from any convenient source, and may be oscillated by any desired means. In some cases it may be necessary to connect the said pipes to an elevated water-tank, however, in localities provided with a water-system, I employ a rotary pump —4— for supplying the pipes with water, and at the same time utilize the said pump as a motive-power for operating the mechanism to oscillate the pipes as will be shortly explained. The pump is provided with the usual inlet-pipe —5— leading from a service-pipe (not shown), and to said inlet-pipe is connected an ordinary valve —6— for opening and closing the said pipe as may be desired.

—7— denotes the discharge-pipe of the pump which is connected by means of a flexible pipe —8— to a pipe —9— secured in the forward end of the main sprinkling-pipe —1— for delivering the water thereto. Where two of said main sprinkling-pipes —1—1— are employed, as shown in the present case, it is obvious that two flexible pipes —8—8— are to be provided. These pipes —8—8— are preferably connected by means of the usual and well known couplings to a T-pipe —9×— connected to the pipe —7— of the pump, said T-pipe being provided with valves —10—10— for controlling the discharge through the pipes —1—1—.

Any suitable mechanism may be employed for transmitting oscillatory motion from the pump to the main sprinkling-pipe —1—. The mechanism shown comprises a short crank —11— fastened to the shaft of the pump and connected by means of a rod —12— to a lever —13— fastened to the pipe —9— which is rigidly secured in the forward end of the pipe —1— as illustrated in Figs. 1 and 3.

—14— denotes a supplemental or branch sprinkling-pipe extending centrally and horizontally over the end plant-rack —B¹— of the green-house and disposed at right angles to and in the plane of the pipes —1—1—. Said branch pipe is journaled in brackets —13×—13×— secured to the sides of posts —14×—14×—.

Any suitable mechanism may be employed for oscillating the branch sprinkling-pipe —14—, however, for convenience I desire to transmit motion from the pipe —1— to said pipe —14—. The preferred mechanism for this purpose comprises two miter-gears —15— 16—, the gear —15— being secured to a shaft —17— secured in the rear end of the pipe —1—, and the gear —16— fastened to the pipe —14—. Either or both of these gears may be of segmental form if desired.

The water is conducted from the main sprinkling-pipe to the branch sprinkling-pipe by means of a flexible pipe —18— connected by suitable couplings —19—20—. The coupling —19— is preferably attached to the shaft —17—, and the coupling —20— is applied to the adjacent end of the pipe —14— as shown in Figs. 2 and 4.

Each of the sprinkling-pipes —1—14— is provided with spraying means which may be of any suitable form. These sprayers consist preferably of downwardly extending flaring nipples —21—21— detachably secured in the pipes and provided with perforated tips as indicated at —22—. It is obvious that said tips may be of various styles and may be provided with perforations of different sizes according to the density or character of the spray desired. I prefer however, to provide interchangeable nipples so as to change the spraying effect.

What I claim as my invention is:

1. An automatic plant-sprinkler, comprising brackets sustained over the bed of plants, oscillatory pipes mounted on said brackets and provided with sprayers, a water-supply pipe, branch-pipes leading from the supply pipe to the oscillatory pipes, and means actuated by the flow of water from the supply pipe and imparting motion to the oscillatory pipes.

2. A plant-sprinkling apparatus comprising a suitably journaled oscillating pipe provided with a series of sprayers, a rotary water pump having a suitable source of supply and discharging the water into said pipe, a crank secured to the shaft of the pump, a lever rigidly connected at one end to the pipe, and a rod connecting the opposite end of the lever to the crank for transmitting oscillatory motion from the pump to the pipe as set forth.

3. An apparatus for the purpose specified comprising two oscillatory sprinkling-pipes, a water-pump having a suitable source of supply and delivering the water under pressure to said pipe, mechanism actuated by the pump for imparting oscillating movement to one of said pipes, and mechanism for transmitting like motion from one pipe to the other as set forth.

4. An apparatus for the purpose specified comprising a main oscillatory sprinkling-pipe and a branch oscillatory sprinkling-pipe disposed at an angle to the main pipe, a rotary pump for delivering water under pressure to the main pipe, a suitable flexible water-connection between the two pipes, mechanism actuated by the pump for imparting oscillations to the main pipe, and gears transmitting like motion from the latter pipe to the branch sprinkling-pipe as set forth.

JOHN W. LISCHER.

Witnesses:
J. J. LAASS,
S. R. LOVINE.